United States Patent [19]

Hösel

[11] Patent Number: 4,982,477
[45] Date of Patent: Jan. 8, 1991

[54] METHOD AND APPARATUS FOR DETECTING SLIVER FEED

[75] Inventor: Fritz Hösel, Mönchen-gladbach, Fed. Rep. of Germany

[73] Assignee: Trützschler GmbH & Co. KG, Mönchen-gladbach, Fed. Rep. of Germany

[21] Appl. No.: 416,780

[22] Filed: Oct. 4, 1989

[30] Foreign Application Priority Data

Oct. 7, 1988 [DE] Fed. Rep. of Germany ....... 3834110

[51] Int. Cl.$^5$ .............................................. D01G 31/00
[52] U.S. Cl. ......................................... 19/0.25; 19/239
[58] Field of Search ........................ 19/0.21, 0.23, 0.24, 19/269

[56] References Cited

U.S. PATENT DOCUMENTS

| | | | |
|---|---|---|---|
| 3,255,495 | 6/1966 | Smith, Jr. | 19/0.23 |
| 3,523,334 | 8/1970 | Dotzauer | 19/0.23 |
| 3,982,301 | 9/1976 | Llach et al. | 19/0.25 |
| 3,999,249 | 12/1976 | Katoh et al. | 19/0.25 |
| 4,193,168 | 3/1980 | Burnett | 19/0.25 |
| 4,266,324 | 5/1981 | Hasezawa et al. | 19/239 |
| 4,302,968 | 12/1981 | Moser | 19/239 |
| 4,306,450 | 12/1981 | Moser | 19/239 |
| 4,512,061 | 4/1985 | Hartmannsgruber et al. | 19/239 |
| 4,646,387 | 3/1987 | Oswald et al. | 19/0.23 |

FOREIGN PATENT DOCUMENTS

| | | |
|---|---|---|
| 1214120 | 4/1966 | Fed. Rep. of Germany ....... 19/0.24 |
| 2011276 | 9/1971 | Fed. Rep. of Germany . |
| 2113783 | 3/1972 | Fed. Rep. of Germany . |
| 2731927 | 2/1979 | Fed. Rep. of Germany . |
| 2363668 | 11/1980 | Fed. Rep. of Germany . |
| 2912576 | 7/1982 | Fed. Rep. of Germany . |
| 2857279 | 2/1986 | Fed. Rep. of Germany . |
| 2949303 | 3/1987 | Fed. Rep. of Germany . |
| 3215673 | 4/1987 | Fed. Rep. of Germany . |
| 2019975 | 11/1987 | Fed. Rep. of Germany . |
| 3617525 | 11/1987 | Fed. Rep. of Germany . |
| 130672 | 4/1978 | German Democratic Rep. . |
| 610017 | 3/1979 | Switzerland . |
| 635373 | 3/1983 | Switzerland . |
| 0735672 | 5/1980 | U.S.S.R. ............................... 19/0.21 |
| 1348399 | 10/1987 | U.S.S.R. ............................... 19/0.21 |
| 1067457 | 5/1967 | United Kingdom . |
| 1133442 | 11/1968 | United Kingdom . |
| 2185105 | 7/1987 | United Kingdom . |

Primary Examiner—Werner H. Schroeder
Assistant Examiner—John J. Calvert
Attorney, Agent, or Firm—Spencer and Frank

[57] ABSTRACT

Apparatus and method for detecting sliver feed or standstill uses comparative measurements over a time-lapse to determine sliver movement. An identical reading in two or more sequential measurements indicates the sliver is not being conveyed, that is, it is either lying motionless or is absent altogether. Signals relating to the sensed standstill may be further processed in the machine control. The sensors are measuring elements capable of detecting thickness of the sliver and may be mechanical, optical or the like.

13 Claims, 2 Drawing Sheets

METHOD AND APPARATUS FOR DETECTING SLIVER FEED

CROSS REFERENCE TO RELATED APPLICATION

This application claims the priority of Federal Republic of Germany Application No. P 38 34 110.7 filed Oct. 7, 1988, which is incorporated herein by reference.

BACKGROUND OF THE INVENTION

This invention relates to a method and an apparatus for detecting the motion (conveyance) of a sliver as it emerges, for example, from a carding machine.

In the manufacture of textile slivers such as carded slivers, the sliver has to be conveyed from one processing station to another, for example, to a storage arrangement such as a sliver coiler and can. Such a conveyance (sliver feed) has to proceed in a strictly prescribed, disturbance-free manner and must therefore be carefully monitored. In particular, breakage of the sliver may lead to problems and must therefore be recognized in a rapid and reliable manner. For this purpose optical systems, such as one-way optical gates or optical proximity switches are being used. These known arrangements have the disadvantage that they are unable to distinguish whether the sliver to be sensed is moved (which means that sliver production is in progress) or whether it is stationary (no production). These known systems can only determine whether a sliver is present in or absent from the detecting range. Due to this limitation, under certain conditions a breakage of sliver can only be unreliably detected, if at all. It is a particular disadvantage that a non-conveyance of the sliver can also not be detected when the sliver is present but is at a standstill. The optical barrier merely shows the presence of the sliver independently of whether the sliver moves or is stationary.

SUMMARY OF THE INVENTION

It is an object of the invention to provide an improved method and apparatus which eliminates the above-discussed disadvantages and with which, in particular, a reliable monitoring of the motion behavior of the sliver is possible with simple means.

This object and others to become apparent as the specification progresses, are accomplished by the invention, according to which, briefly stated, a plurality of sliver thickness measurements is made and compared to determine whether thickness variations occurred over a time period.

Every sliver has thickness fluctuations along its length. To determine whether a sliver moves (that is, whether it is conveyed), along the conveying path (feed path) two or more measurements are performed which determine the thickness or shape of the running sliver passing through those locations. As long as the sliver is in motion, continuously elatively thick and relatively thin sliver locations are alternately sensed. As soon as the sliver is not conveyed, that is, it either is lying motionless or is absent altogether, the measuring elements (sensors) indicate a stationary condition. Such stationary condition is sensed and evaluated. The signal relating to the sensed standstill may be further processed in the machine control, for example, for the purpose to definitely stop the transport device.

Preferably, the sensors are measuring elements capable of detecting the thickness (diameter) of the sliver. The measuring elements may be mechanical sensing levers, optical measuring instruments or the like. Sensors which determine the sliver thickness and/or sliver shape may also be used. By detecting the sliver configuration, the possibility is provided to detect sliver breakages by an analysis of the structure of the sliver surface.

The apparatus for practicing the invention has at least one measuring element for determining the thickness and/or configuration of the sliver, connected with a comparator for comparing at least two sliver thickness or sliver shape values. To determine whether the sliver is moved (transported) along the transporting path one or more stationary sensors are provided which are capable of determining the thickness or shape of the running sliver. Expediently, the measuring member is a sliver trumpet which includes a mechanical sensor lever. Such an arrangement ensures a simple and inexpensive sensing device. If an optical measuring element is used, it is preferable to employ a coupled-charge device (hereafter CCD element). Expediently, at least two measuring elements for determining the thickness or configuration of the sliver are arranged serially along the travelling path of the sliver.

According to a further advantageous feature of the invention, an additional sensor is provided which detects the presence or absence of the sliver. Such a combination is useful in case a sliver sensing with the sliver trumpet in the calender unit is not possible.

The measuring device advantageously comprises a first sliver trumpet situated upstream of the calender rollers of a card and a second sliver trumpet situated upstream of the pressing rollers of a sliver coiler. The measuring elements, for example, the contacting levers in both trumpets, are advantageously connected with an evaluating device which is connected with the drive for the sliver feed, such as a machine control. As soon as one of the two measuring trumpets reports a stationary condition of the sliver, a distrubance (such as sliver breakage) in the transport is recognized. Expediently, the recognition of a sliver standstill is automatically effected by taking into account the actual operational conditions of the card. Thus, the delivery speed may be taken into account in recognizing sliver breakage. In this manner, an optimal reaction time for all sliver velocities may be obtained.

The invention also encompasses a combination of thickness sensors, for example, mechanical contacting levers and optical measuring devices. In a sliver producing card which, in any event, is provided, at the card output, with a first sliver trumpet and, at the sliver coiler, with a second sliver trumpet, a modification of these trumpets to practice the invention lead only to a minimum of added expense.

DESCRIPTION OF THE PREFERRED EMBODIMENTS

Figure 1:
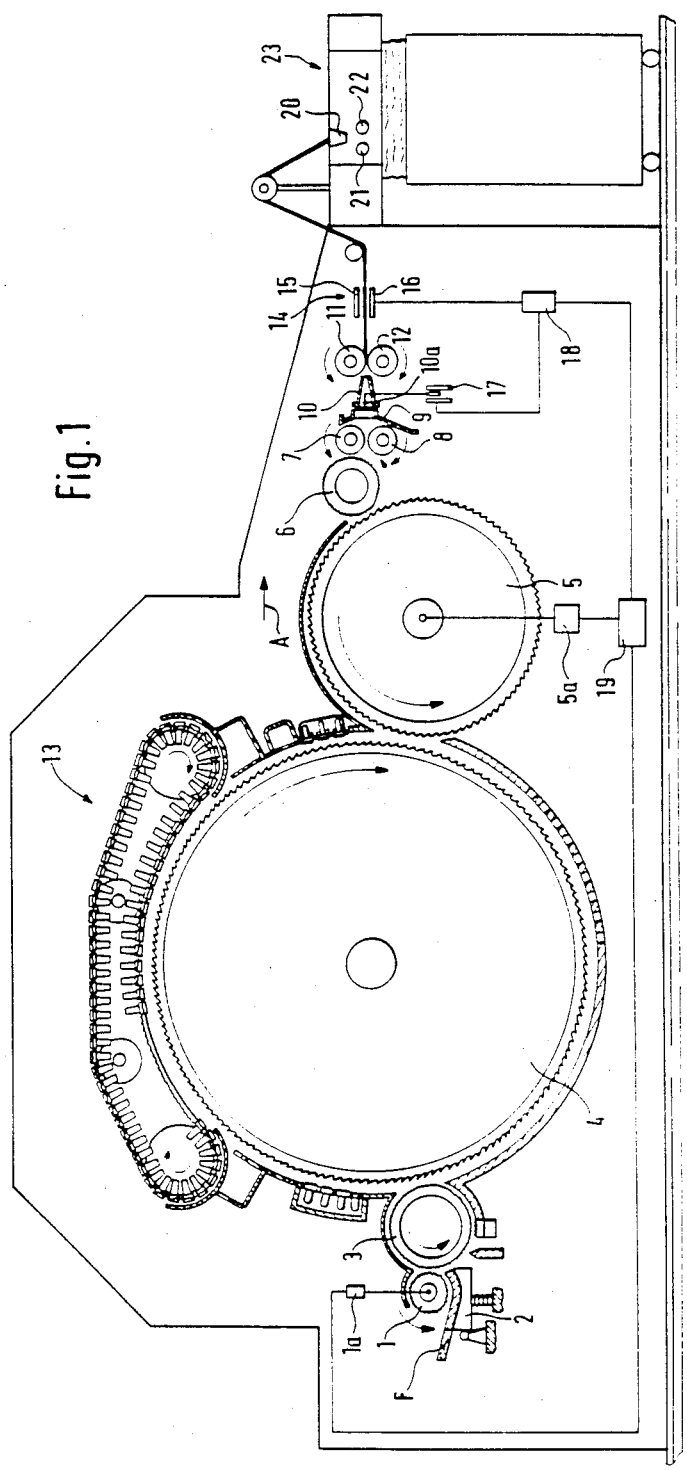
FIG. 1 is a schematic side elevational view of a carding machine incorporating a preferred embodiment of the invention.
Figure 4:
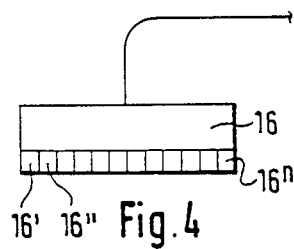
FIG. 4 is a schematic view of an element of the preferred embodiment.

Turning to FIG. 1, there is illustrated therein a known carding machine which may be, for example, an EXACTACARD DK 740 model, manufactured by Trützschler GmbH & Co. KG, Mönchengladbach, Federal Republic of Germany. The carding machine has a feed roller 1 cooperating with a feed table 2, a licker-in 3, a main carding cylinder 4, a doffer 5, a stripper roller 6, crushing rollers 7, 8, a web guiding element 9, a sliver trumpet 10, calender rollers 11, 12 and travelling flats 13. The fiber material is, as a fiber tuft lap F, advanced to the feed roller 1 for example, from a non-illustrated feed chute, and, after processing within the carding machine, a sliver B emerges from the calender rollers Downstream of the calender rollers 11, 12 an optical device 14 is disposed which is formed of a light transmitter 15 and an oppositely located light detector 16. The light detector 16 comprises an image processing charge-coupled device (CCD-element) situated opposite the light transmitter 15. The light detector 16 has a plurality of light detecting elements $16'$, $16''$ ... $16^n$ which are arranged in a side-by-side series as illustrated in FIG. 4. The width of the light detector 16 exceeds the diameter d of the sliver B. The distance between the light emitter 15 and the light detector 16 is so designed that a clearance is maintained between the sliver and the light source 15 and between the sliver and the light detector 16 as the sliver passes through the optical device 14. The CCD-element may be an image processing CCD, for example, a CCD line sensor in which all photoelements are aligned in one line in a geometrically precise manner. For example, a line sensor with 3,456 image dots (photoelements) may be used. Since the CCD element is formed of, for example, 2,000 small individual light receiving elements $16'$, $16''$ .... $16^n$, each of which has to be sequentially called, and for the thickness result the sum of the light sensor elements has to be used, the calling rhythm is predetermined by the CCD element in a defined manner.

The sliver trumpet 10 has a sliver contacting lever 10a connected with an inductive displacement sensor 17 which, as well as the light detector 16, is connected to an electronic evaluating device 18 which may be a TMS model microcomputer manufactured by Trützschler GmbH & Co. KG. The evaluating device 18 is coupled to an electronic control apparatus 19 which controls the operation of the carding machine and which applies signals to a controllable drive motor 1a for the feed roller 1 and to a controllable drive motor 5a for the doffer 5.

Figure 2:
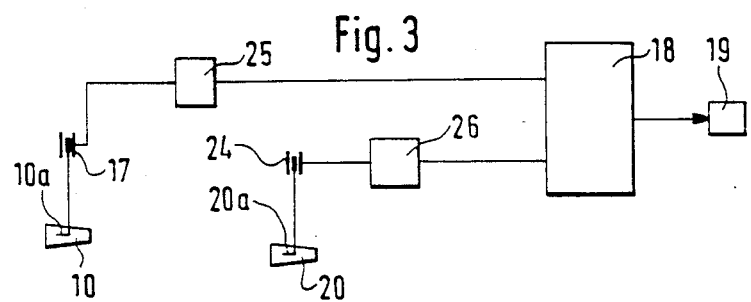
FIG. 2 is a side elevational view of a sliver length showing thickness variations (configurational changes) along its length.
Figure 3:
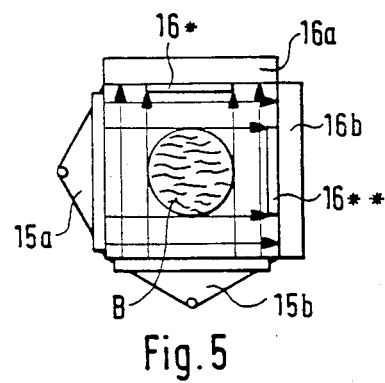
FIG. 3 is a block diagram of a variant of the preferred embodiment.

Turning now to FIG. 3, the embodiment of the invention illustrated therein includes the sliver trumpet 10 which incorporates the contact lever 10a and which is situated upstream of the calender rollers 11, 12 of the carding machine and a sliver trumpet 20 which incorporates a sliver contact lever 20a and which is situated immediately upstream of the pressing rollers 21, 22 of a conventional sliver coiler 23. The measuring trumpets 10 and 20 are connected via respective inductive displacement sensors 17 and 24 and respective amplifiers 25 and 26 to the evaluating device 18 which, in turn, is coupled to the machine control apparatus 19. The sliver illustrated in FIG. 2 runs through the trumpets 10 and 20 and its momentary thickness in the trumpets are sensed by the respective sensor levers 10a and 20a.

Figure 5:
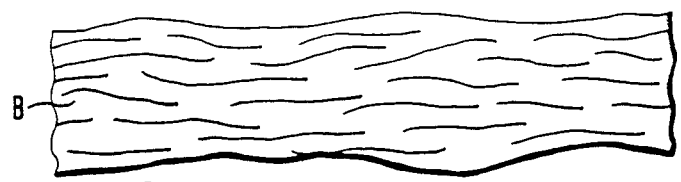
FIG. 5 is a schematic end elevational view of a variant of a component of the preferred embodiment, including elements of FIG. 4.

Turning to FIG. 5, there is schematically illustrated therein an optical sensor device having a plurality of angularly offset light emitters 15a, 15b and associated CCD elements 16a, 16b. Arrows indicate how the light transmitters 15a and 15b send light rays to the associated, oppositely located light detectors 16a and 16b. Each light detector 16a, 16b has up to several thousands of individual small light receiving elements $16'$, $16''$ ... $16^n$, as shown in FIG. 4. Each element generates a single signal upon impingement of light thereon. In case the sliver B is situated between the light transmitters 15a, 15b and the light receivers 16a, 16b, only those light sensor elements $16'$, $16''$ .... $16^n$ emit an electric signal which do not lie in the shadow $16^*$ or $16^{**}$ of the sliver B. From the sum of the light sensor elements $16'$, $16''$ .... $16^n$ lying in the shadows $16^*$ and $16^{**}$ the thickness d (or diameter) of the sliver B may be directly derived. A measurement in two directions, that is, in the direction of the two light sensors 16a, 16b has the advantage that deviations from a circular cross section, for example, an elliptical or other cross section may also be measured and thus a sliver shape determination may be effected. Each individual small light sensor element $16'$, $16''$ .... $16^n$ has a light sensitive area a of approximately 1/100 mm, that is, even individual threads which are thicker than 1/100 mm may be detected. For determining the sliver thickness, all non-illuminated light receiving elements $16'$, $16''$ .... $16^n$ may be added so that even boundary threads in the sliver are accounted for. Since such a procedure is identical independently from the sliver thickness in each fiber sliver, a lack of sharpness at the edges of the sliver B is without effect. By virtue of the high resolution of the individual light sensor elements $16'$, $16''$ .... $16^n$, with the apparatus according to the invention it is feasible to reproduce and evaluate a detailed true image of the sliver B, and, due to the multitude of performed measurements, a substantially complete "movie" of the throughgoing sliver B can be obtained.

Figure 6:
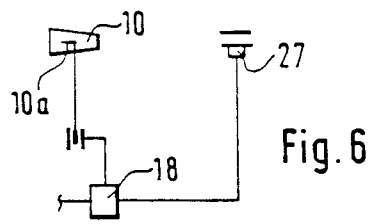
FIG. 6 is a block diagram of another preferred embodiment of the invention.

FIG. 6 illustrates a further embodiment of the invention. Downstream of the sliver trumpet 10 (as viewed in the direction of sliver advance) an optical barrier 27 is disposed which reports to the evaluating device 18 the presence or absence of the sliver B. In the evaluating device 18 two or more sequential thickness measurements effected in the sliver trumpet 10 are compared.

It will be understood that the above description of the present invention is susceptible to various modifications, changes and adaptations, and the same are intended to be comprehended within the meaning and rang of equivalents of the appended claims.

What is claimed is:

1. A method of detecting feed or standstill of a fiber sliver comprising the steps of sequentially performing thickness measurements of the sliver by a sensor situated along a feed path of the sliver and comparing the thickness measurements for determining thickness deviations in the sliver in the course of a time lapse, whereby the measurements are analyzed and a signal relating to a sensed standstill may be used to stop a sliver transport device.

2. An apparatus for detecting feed or standstill of a fiber sliver comprising a sliver thickness sensor situated along a feed path of the sliver and a comparator means connected to the sliver thickness sensor for comparing sequential thickness measurements by said sliver thickness sensor and for determining thickness deviations in the course of a time lapse.

3. An apparatus as defined in claim 2, further comprising a sensor means situated along said feed path for determining a presence or absence of the sliver.

4. An apparatus as defined in claim 2, wherein said sliver thickness sensor comprises a sliver trumpet including a mechanical sliver contacting lever executing motions in response to variations of thickness of the sliver in the course of its passage through the sliver trumpet.

5. An apparatus as defined in claim 4, further comprising a transducer connected to said lever and said comparator; said transducer transforming motions of said contacting lever into electric signals representing said motions.

6. An apparatus as defined in claim 2, wherein said sliver thickness sensor comprises an optical measuring element.

7. An apparatus as defined in claim 6, wherein said sliver thickness sensor comprises a plurality of CCD elements arranged angularly offset relative to one another with respect to an axis oriented parallel to the direction of sliver feed.

8. An apparatus as defined in claim 6, wherein said optical measuring element is a CCD element.

9. An apparatus as defined in claim 2, wherein said sliver thickness sensor is a first sliver thickness sensor; further comprising a second sliver thickness sensor arranged at a distance from said first sliver thickness sensor for sensing sliver thicknesses at a location spaced from said first sliver thickness sensor; said second sliver thickness sensor being connected to said comparator means.

10. An apparatus as defined in claim 9, in combination with a carding machine and a sliver coiler connected to a sliver output of the carding machine; said carding machine having a first sliver trumpet situated upstream of the sliver output as viewed in the direction of sliver feed and said sliver coiler having pressing rollers between which the sliver passes and a second sliver trumpet situated upstream of said pressing rollers; said first and second sliver thickness sensors being incorporated in said first and second sliver trumpets, respectively.

11. An apparatus as defined in claim 10, further comprising motor means for advancing fiber material through said carding machine; and a carding machine control apparatus having an input connected to an output of said comparator means; the control apparatus having output means connected to said motor means.

12. A method of detecting feed or standstill of a fiber sliver comprising the steps of sequentially performing thickness measurements of the sliver by a stationary sensor situated at a predetermined location along a feed path of the sliver and comparing the thickness measurements for determining, at said location, thickness deviations in the sliver in the course of a time lapse, whereby the measurements are analyzed and a signal relating to a sensed standstill may be used to stop a sliver transport device.

13. An apparatus for detecting feed or standstill of a fiber sliver comprising a stationary sliver thickness sensor situated at a predetermined location along a feed path of the sliver and a comparator means connected to the sliver thickness sensor for comparing sequential thickness measurements by said sliver thickness sensor and for determining, at said location, thickness deviations in the course of a time lapse.

* * * * *